United States Patent
Akhtar

(10) Patent No.: US 12,556,210 B2
(45) Date of Patent: Feb. 17, 2026

(54) POWER EFFICIENT RECEIVER ARCHITECTURE

(71) Applicant: Texas Instruments Incorporated, Dallas, TX (US)

(72) Inventor: Siraj Akhtar, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 352 days.

(21) Appl. No.: 17/828,524

(22) Filed: May 31, 2022

(65) Prior Publication Data

US 2023/0283310 A1  Sep. 7, 2023

Related U.S. Application Data

(60) Provisional application No. 63/316,372, filed on Mar. 3, 2022.

(51) Int. Cl.
*H04B 1/12* (2006.01)
*H04J 13/00* (2011.01)

(52) U.S. Cl.
CPC .................. *H04B 1/123* (2013.01)

(58) Field of Classification Search
CPC ........ H04B 1/1036; H04B 15/00; H04B 1/10; H04B 2001/1063; H04B 1/7103; H04B 1/71; H04B 2201/709709; H04B 2201/709718; H04W 72/541; H04W 72/542; H04W 72/0453; H04W 24/02; H04W 24/08; H04W 88/08; H04W 28/04; H04W 24/00; H04L 5/0048; H04L 5/0073; H04L 27/2613; H04L 5/0007; H04L 1/00; H04L 25/0226; H04L 5/0023; H04L 27/26

USPC ........................................................ 375/349
See application file for complete search history.

(56) References Cited

U.S. PATENT DOCUMENTS

| | | | | |
|---|---|---|---|---|
| 5,617,862 | A * | 4/1997 | Cole | G01S 15/8913 600/459 |
| 9,660,670 | B1 * | 5/2017 | Garrett | H04W 8/22 |
| 2010/0150284 | A1 * | 6/2010 | Fielder | H04B 1/3805 375/345 |
| 2010/0172450 | A1 * | 7/2010 | Komaili | H04L 27/3809 375/345 |
| 2011/0069787 | A1 * | 3/2011 | Lee | H04L 27/0012 455/150.1 |
| 2017/0077886 | A1 * | 3/2017 | Alavi | H03F 3/189 |
| 2017/0359136 | A1 * | 12/2017 | Dufrene | H04L 5/0051 |

* cited by examiner

*Primary Examiner* — Eva Y Puente
(74) *Attorney, Agent, or Firm* — Frank D. Cimino

(57) ABSTRACT

Power efficient receiver architectures are described. A receiver includes a first receiver path having a low power consumption compared to a second receiver path with a higher power consumption but a better ability to remove blocking signals. A multiplexer at the output of both receiver paths is used to select the digital bit stream from either the first path or the second path based on whichever path is currently enabled. The first receiver path can be enabled by default until a blocker signal is detected or the received data is invalid. At such an instance, the first receiver path is disabled and the second receiver path is enabled to remove the blocker and read out the data. The second receiver path may then continue to be enabled for a particular number of pings before switching the output back to the first receiver path.

22 Claims, 8 Drawing Sheets

POWER EFFICIENT RECEIVER ARCHITECTURE

CROSS-REFERENCE TO RELATED APPLICATION

This application claims the benefit of and priority to U.S. provisional patent application No. 63/316,372 filed on Mar. 3, 2022, which is incorporated herein by reference in its entirety.

TECHNICAL FIELD

This description relates to radio frequency (RF) receivers, and more particularly, to receivers designed for communication over short distances.

BACKGROUND

RF receivers are designed to detect weak signals containing the desired data in the presence of out-of-band or otherwise undesired signals, generally referred to herein as blocking signals or blocker signals, or blockers for short. This may be accomplished by down conversion using an LO (local oscillator) with a frequency at the center of the frequency band to be detected by the receiver (e.g., direct down conversion) followed by low-pass filtering of the out-of-band blockers. This LO is derived from a phase locked loop (PLL) that is locked to a reference oscillator. The down conversion process can reject out-of-band blockers that can't be merely filtered at RF frequencies, due to their close proximity to the wanted channel. While effective, such a receiver requires substantial power for continuous operation of the PLL and downconverter.

In some short-wave communication applications, blocker signals can become significantly attenuated due to a variety of factors such as the short communication distance, small antenna sizes, orientation of the antennas, polarization and surrounding conductive material. However, blocker signals are not eliminated completely, and can still disrupt the communication when certain factors are met. For this reason, the short distance communication receiver must still have the ability to remove blockers, but the power required to do so creates design challenges.

Accordingly, a number of non-trivial issues remain with operating a receiver without drawing too much power.

SUMMARY

Power efficient receiver architectures are described. The receiver uses two different signal paths depending on whether a blocker signal has been detected. Responsive to no blocker signals being present, a low-power path can be used that does not use a phase locked loop (PLL), and responsive to a blocker signal being detected, a higher-power path can be used that may use a PLL to perform down conversion of the received signal.

One example receiver includes an antenna configured to receive an input analog signal, a first receiver branch comprising a diode detector configured to receive the input analog signal, followed by a low pass filter and a first analog-to-digital converter configured to produce a first digital signal, a second receiver branch configured to receive the input analog signal and comprising a mixer configured to mix the input analog signal with a local oscillator signal, followed by a low pass filter and a second analog-to-digital converter configured to produce a second digital signal, and a digital logic module configured to switch an output of the receiver from the first digital signal to the second digital signal responsive to a determination that a blocking signal exists with the input analog signal and/or that the input analog signal contains invalid data.

In another example, receiver circuitry includes a multiplexer (MUX), an overload detector, a modem, and a control logic module. The multiplexer is configured to switch between a first digital signal associated with an input analog signal received via a first receiver branch and a second digital signal associated with the input analog signal received via a second receiver branch based on a MUX select signal, and output a selected digital signal. The overload detector is configured to receive the selected digital signal, determine whether a blocking signal exists within the selected digital signal, and responsive to determining that a blocking signal exists within the selected digital signal, assert a first output control signal. The modem is configured to receive the selected digital signal, determine whether the selected digital signal includes invalid data, and responsive to determining that the selected digital signal includes invalid data, assert a second output control signal. The control logic module is configured to receive the first output control signal and the second output control signal, and toggle a state of the MUX select signal based on the first output control signal and/or the second output control signal.

Another example receiver includes an antenna configured to receive an input analog signal, a first receiver branch comprising a diode detector configured to receive the input analog signal and to provide a first analog signal, a second receiver branch configured to receive the input analog signal and comprising a mixer configured to mix the input analog signal with a local oscillator signal and to provide a second analog signal, a switch configured to select between the first analog signal and the second analog signal responsive to a received select signal and configured to produce a selected analog signal, a low pass filter, an analog-to-digital converter configured to receive the selected analog signal and configured to produce a selected digital signal, and a digital logic module configured to toggle the select signal responsive to a determination that a blocking signal exists within the selected digital signal and/or that the selected digital signal contains invalid data.

DETAILED DESCRIPTION

Figure 1:
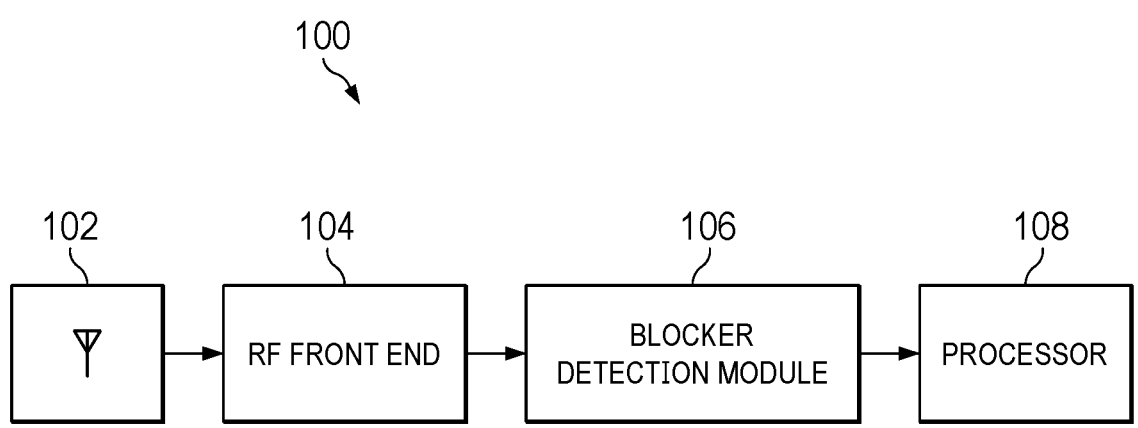
FIG. 1 is a block diagram of an example receiver architecture.

Power efficient receiver architectures are described herein. Although the receivers described herein can be used in any number of applications, they are particularly well-suited for short distance communication, such as for communication between different printed circuit boards (PCBs) within the same device (e.g., within a given housing or package). According to some embodiments, a receiver includes a first receiver path in parallel with a second receiver path. The first receiver path has a low power consumption diode square law peak detector. The second receiver path has a blocker-resilient, higher power consumption, local oscillator (LO) derived from a phase locked loop (PLL). Both receiver paths may contain a low-pass filter (LPF) and a threshold detector that slices a received analog signal into a digital bit stream, which is sampled on a system clock. A multiplexer at the output of both receiver paths is used to select the digital bit stream from either the first path or the second path based on whichever path is currently enabled. According to some embodiments, the first receiver path having lower power consumption is enabled by default and continues to be enabled to receive analog signals until a blocker signal is detected (e.g., via an overload detector) and/or the received data is declared invalid (e.g., via cyclic redundancy checking). Invalid data may be received if a modulated blocker exists. After a blocker has been detected and/or the received data is deemed to be invalid, the first receiver path is disabled and the second receiver path is enabled to remove the blocker and read out the data. In some examples, the second receiver path can be immediately disabled after receiving the data and the first receiver path is re-enabled. In some other examples, the second receiver path continues to be enabled for a particular number of pings before switching the output back to the first receiver path. In some embodiments, the PLL within the second receiver path remains separately enabled for some period of time even after all other components of the second receiver path have been disabled, because reinitiating the PLL consumes a relatively large amount of time, adding to latency. In any such cases, power consumption overall is reduced as the receiver operates at least some of the time (if not most of the time) within the first receiver path, which has a lower power consumption compared to the second receiver path.

General Overview

As described above, there remain a number of non-trivial issues with operating a power efficient receiver. When no out-of-band blockers exist, a diode (square law) peak detector can be used to receive RF signals. Power consumption for such a receiver is very low, because no (local oscillator) LO signal is required, and the peak detector itself consumes negligible or otherwise relatively low power. However, a peak detector can't distinguish between frequency content, so it can't operate in the presence of a blocker. Thus, such receivers are rarely used for most applications that exist in noisy environments. However, for very short or short distance half duplex (TDD—time division duplex) wireless communication, particularly in the centimeter and millimeter wave bands, blockers can be infrequent and significantly attenuated based on factors such as distance, small antenna size (due to higher frequency), orientation, polarization and surrounding metal. Accordingly, using a diode peak detector with low power consumption, may work for a majority of the time in the case where blockers are infrequent. But, even if infrequent, blockers can still exist, which necessitates the use of higher-power components, such as a PLL, to remove the blocker signal. The use of the PLL is essentially wasting power for the majority of received signals that do not contain a blocker, especially for very short wireless communication applications.

Thus, and according to an embodiment, a power efficient receiver is described herein that adaptively changes between a low-power state and a higher-power state based on whether blocker signals have been detected. Various scenarios can exist, based upon which the downconverter may or may not be enabled. For instance, example such scenarios can include "Ping"; "Valid Data, No Blocker"; "Valid Data, Blocker Present"; and "No Data, Blocker Only." In the "Ping" scenario, the receiver periodically wakes up to listen for any RF signals and only enables the first receiver path (with the diode detector). Upon finding no signal (e.g., an empty packet), the receiver goes back to sleep (e.g., both receiver paths are disabled). In some situations, receivers spend the majority of the time operating in the ping mode. For the "Valid Data, No Blocker" scenario, if a signal is detected via the first receiver path, the received information is checked to determine whether the data is valid. If it is, then the first receiver path remains enabled without activating any components of the second receiver path (the Rx PLL remains asleep or otherwise in a low or no power consumption state). For the "Valid Data, Blocker Present" scenario, if a signal is detected by the diode detector, then the received information is checked for the presence of a blocker and/or for invalid data. If a blocker exists or if the data is found to be invalid, the PLL is awakened, the second receiver path is enabled, and any blocker is filtered out after requesting retransmission of the data. The resulting valid data is read out. The PLL continues to stay on until reception is complete. According to some examples, the second receiver path can be disabled following receipt of the valid data or remain on for a defined number of pings (because a prior transmission implies an increased probability of more data to come), after which it can be disabled. For the "No Data, Blocker Only" scenario, if a signal is detected by the diode detector, then the received information is checked for the presence of a blocker and/or for invalid data. In this case, the PLL is awakened, the second receiver path is enabled, and any blocker is filtered out. Because the resulting signal is empty (e.g., invalid data), the second receiver path can be disabled or remain on for a defined number of pings.

As described above, the second receiver path can remain active for a particular number of pings after removing a blocker signal, before the receiver returns to using the first receiver path. The particular number of pings can start at a first value and be dynamically increased if a blocker is still found to exist in further signals received. For example, the second receiver path may be set to be enabled for 10 pings. If, after the 10th ping, a blocker signal is still detected in the received RF signal, then the second receiver path may be enabled for an additional 10 pings, or for more pings, such as for an additional 20 pings.

According to some embodiments, multiple enable signals may be used to activate different components of the second receiver path. For example, a first enable signal may be used to enable/disable the PLL separately from the other components of the second receiver path. Doing so allows for the PLL to remain enabled for a particular period of time (or number of pings) after disabling the rest of the second receiver path. This can provide additional power saving, and save time, because starting the PLL takes time and consumes additional power, and the PLL may need to be used again right after reenabling the first receiver path if a blocker signal is still detected.

RF Receiver Architecture

FIG. 1 is a block diagram of a receiver 100, according to some embodiments. Receiver 100 may be used in a variety of RF applications, such as for very short distance communication (e.g., 5-10 mm) between PCBs or chips, or between a PCB and a chip, or between dies within a given multi-die package. Receiver 100 may include at least an antenna 102, an RF front end 104, a blocker detection module 106, and a processor 108. In some embodiments, processor 108 may be considered a separate component from the remainder of receiver 100 and may be provided on a separate chip. In some embodiments, the analog components of receiver 100 (antenna 102 and RF front end 104) are provided on one chip and the digital components of receiver 100 (blocker detection module 106 and processor 108) are provided on another chip.

Antenna 102 may include one or more patch antennas or microstrip antennas, according to some embodiments. Antenna 102 may include any number of antennas. In some embodiments, antenna 102 may include one or more antennas to support multiple communication bands (e.g., dual band operation or tri-band operation). Various ones of the antennas may support centimeter or millimeter wave communications. For example, antenna 102 may be configured for receiving frequencies between about 24 GHz and about 24.25 GHz. More generally, antenna 102 may be any number of antenna types and configurations suitable for receiving (and possibly transmitting) desired communication signals. Antenna 102 may reside on the same silicon chip that includes RF front end 104, the package that includes RF front end 104, or on the same PCB as RF front end 104, to name a few examples.

RF front end 104 may include various components that are designed to filter, amplify, and tune selected portions of a received RF signal, according to an embodiment. RF front end 104 can include one or more integrated circuit (IC) chips packaged together in a system in package (SIP). According to some embodiments, RF front end 104 includes two separate receiver paths for the RF signal. Only one receiver path can be active at a given time. The selected receiver path is chosen based on one or more determinations made by blocker detection module 106. According to some such embodiments, a first receiver path of RF front end 104 includes a diode detector and an analog-to-digital converter that together operate at relatively low power, and the second receiver path of RF front end 104 includes down conversion elements (e.g., such as a PLL, and an analog-to-digital converter) that together allow for the attenuation of blocker signals, but that consume higher power compared to the first receiver path. In either case, the received RF signal may be filtered using any number of low-pass or band-pass filters and/or amplified using, for example, a low noise amplifier (LNA). Furthermore, either receiver path generates an input digital signal to be received by blocker detection module 106.

According to some embodiments, blocker detection module 106 includes any number of digital logic components designed to determine whether a blocker signal exists in the received input digital signal and/or if the input digital signal contains valid data. Depending on these determinations, blocker detection module 106 enables/disables each of the first and second receiver paths of RF front end 104, according to some embodiments. The digital logic used to determine which receiver path to enable or disable may be programmed and compiled using a hardware language such as Verilog or Very High-Speed Integrated Circuit Hardware Description Language (VHDL) and implemented as a field programmable gate array (FPGA) or in any application specific integrated circuit (ASIC), according to some embodiments.

In an example, blocker detection module 106 includes an overload detector configured to determine whether the received digital signal includes a blocker signal. The overload detector can assert an overload signal if a blocker is detected and provide the overload signal to a control logic module, which controls the enabling or disabling of the receiver paths. Blocker detection module 106 may also include a cyclic redundancy checking (CRC) circuit configured to determine whether the data on the digital signal is valid. The cyclic redundancy checking (CRC) circuit, such as that included in a modem, is configured to determine whether the digital signal contains valid data, although any other data validation technique could be used as well. The modem or other CRC circuit can assert a CRC signal if the data is determined to be invalid and provide the CRC signal to the control logic module.

Processor 108 may be configured to receive the received digital signal after determining that no blocker signal exists and that the data is valid. Processor 108 may proceed to perform any number of operations with the signal. As used herein, the term "processor" may refer to any device or portion of a device that processes electronic data from registers and/or memory to transform that electronic data into other electronic data that may be stored in registers and/or memory. Processor 108 may include one or more digital signal processors (DSPs), application-specific integrated circuits (ASICs), central processing units (CPUs), graphics processing units (GPUs), crypto-processors (specialized processors that execute cryptographic algorithms within hardware), server processors, custom-built semiconductor, or any other suitable processing devices. The nature of processing performed by processor 108 may be application-specific and thus can vary from one example to the next.

Figure 2A:
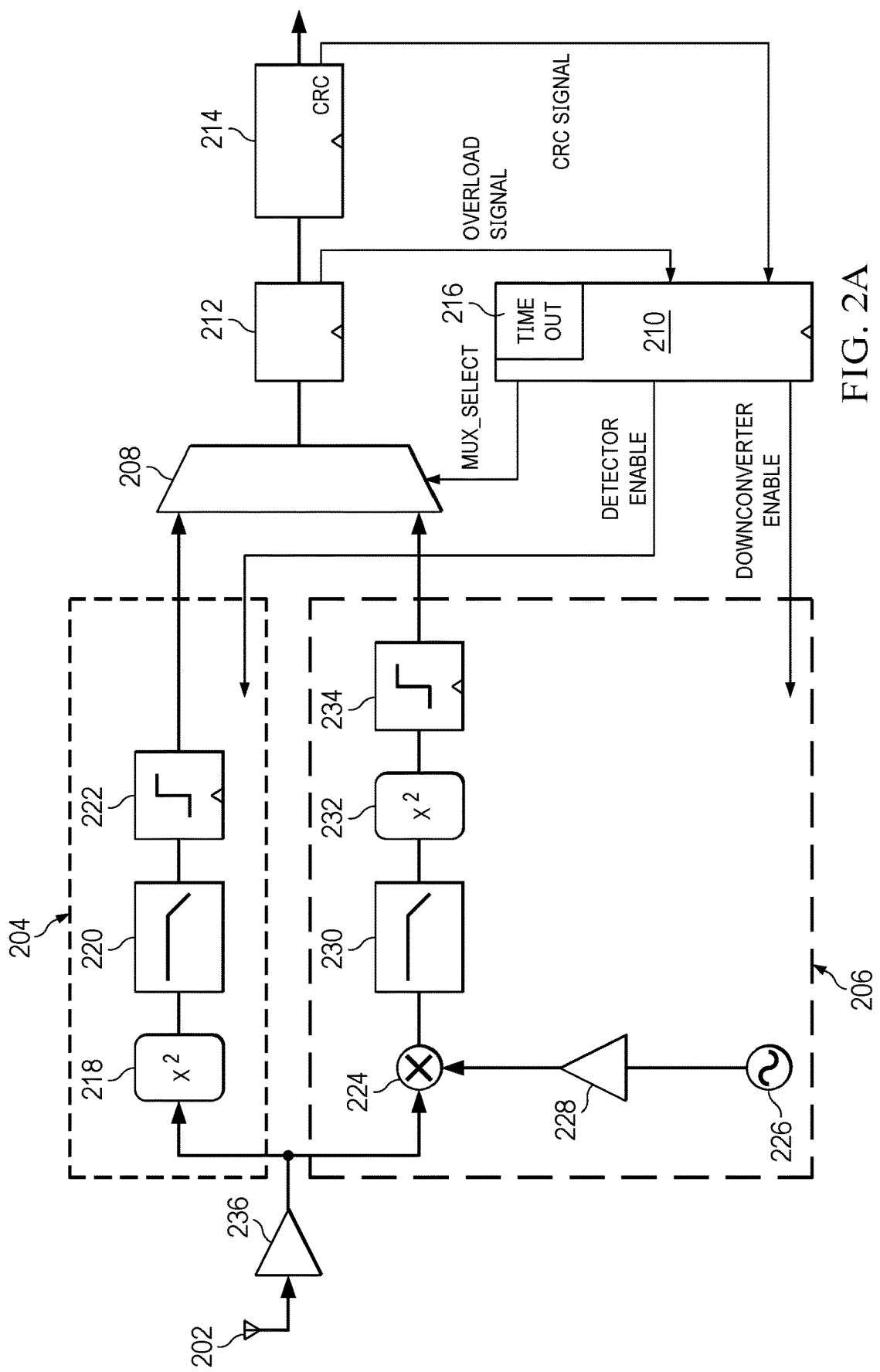
FIG. 2A is a block diagram of an example of an RF front end and digital logic of the receiver of FIG. 1.

FIG. 2A schematically illustrates details for the topology of both RF front end 104 and blocker detection module 106, according to some embodiments. The RF front end includes an antenna configured to receive RF signals followed by two receiver paths, a first receiver path 204 and a second receiver path 206. According to some embodiments, first receiver path 204 uses relatively low power to operate and is used for the majority of the time by the receiver. In contrast, second receiver path 206 uses more power than first receiver path 204, and is expected to be used sparingly (e.g., when blockers are detected and/or invalid data is received).

The RF signal through either receiver path is filtered and converted to a digital signal received by a multiplexer 208. Thus, according to some embodiments, multiplexer 208 switches an output multiplexer signal between either a first digital signal from first receiver path 204 or a second digital signal from second receiver path 206 based on the state of a MUX_SELECT signal. The state of MUX_SELECT is determined by control logic module 210, as described below.

According to some embodiments, the digital output signal from multiplexer 208 is received by an overload detector 212. Overload detector 212 may include any logic designed to check for a particular series of '1' bits in the received data stream. Such a constant and consecutive series of '1' bits indicates the presence of a blocker signal that is overwhelming the data signal. If a particular number of '1' bits are found by overload detector 212, the OVERLOAD SIGNAL is asserted to indicate the presence of a blocking signal. The number of '1' bits that trigger the determination of a blocker being present can be programmed by a user, or may be dynamically changed based on any other external factors.

According to some embodiments, the digital output signal from multiplexer 208 also passes through overload detector 212 and onto a modem 214. Modem 214 may be configured to validate the received digital signal before passing it on to any further digital components (such as processor 108). If data is not found to be valid, modem 214 does not pass on the digital signal. Modem 214 may use any known digital validity routine to check for valid data on the received digital signal. In an embodiment, modem 214 uses cyclic redundancy checking (CRC) to detect errors in the bitstream. If the validity check fails, the data stream is not passed onwards and CRC SIGNAL is asserted to indicate that invalid data has been received. In some situations, the data is deemed invalid due to the presence of a blocker that is also detected by overload detector 212. In some situations, the data is deemed invalid due to the presence of a blocker that was not detected by overload detector 212. This can happen with certain modulated blocker signals. Accordingly, modem 214 can act as both a redundancy element to determine the presence of blockers that overload detector 212 also detects and as a more advanced checkpoint to determine the presence of certain blockers that overload detector 212 does not detect.

According to some embodiments, control logic module 210 receives both OVERLOAD SIGNAL and CRC SIGNAL and determines the state of each of DOWNCONVERTER ENABLE, DETECTOR ENABLE, and MUX_SELECT signals based at least on the state of OVERLOAD SIGNAL and CRC SIGNAL. For example, MUX_SELECT by default is set to select the output from first receiver path 204, but MUX_SELECT is toggled by control logic module 210 to select the output from second receiver path 206 responsive to either OVERLOAD SIGNAL or CRC SIGNAL being asserted. Similarly, DETECTOR ENABLE may be asserted by default (with DOWNCONVERTER ENABLE not asserted) to activate the components of first receiver path 204. Responsive to either OVERLOAD SIGNAL or CRC SIGNAL being asserted, control logic module 210 may deassert DETECTOR ENABLE while asserting DOWNCONVERTER ENABLE to activate the components of second receiver path 206. The DETECTOR ENABLE signal may be used to enable/disable the clock signal that feeds various elements of first receiver path 204 or it may be used to switch on/off the power to the various elements of first receiver path 204. Similarly, The DOWNCONVERTER ENABLE signal may be used to enable/disable the clock signal that feeds various elements of second receiver path 206 or it may be used to switch on/off the power to the various elements of second receiver path 206.

According to some embodiments, control logic module 210 also includes timeout logic 216 that is configured to delay the return to first receiver path 204 after using second receiver path 206. Without timeout logic 216, after an RF signal has been received via second receiver path 206 and validated with modem 214, control logic module 210 would reenable first receiver path 204 and disable second receiver path 206. This can prove inefficient, however, as the presence of a blocker signal in a given received RF signal often indicates that the blocker signal will still be present for at least the next few received RF signals. Thus, according to some embodiments, timeout logic 216 can be used to cause control logic module 210 to essentially ignore the states of OVERLOAD SIGNAL and CRC SIGNAL and to maintain the enablement of second receiver path 206 for a particular number of pings (e.g., times that the receiver listens for new data). For example, timeout logic 216 may set a ping counter to an initial value, such as 10, which counts down after each receiver ping is performed. After the ping counter reaches 0, only then will control logic module 210 assert DETECTOR ENABLE to activate first receiver path 204 and toggle MUX-SELECT to select the output of first receiver path 204, while also deasserting DOWNCONVERTER ENABLE. In some embodiments, the ping counter value can be dynamically increased if blocker signals are still determined to be present. For example, if after 10 pings a blocker signal is detected on the next ping, then the ping counter can be increased to a higher value, such as 20, such that the receiver will delay returning to first receiver path 204 for 20 pings. The ping counter initial values can continue to be dynamically increased if blockers continue to be detected. In some examples, the ping counter will not increase above a ceiling value, such as 40 pings.

According to some embodiments, first receiver path 204 includes a diode detector 218, a filter 220, and an analog-to-digital converter (ADC) 222. Diode detector 218 along with filter 220 may together form an envelope detector. According to some embodiments, diode detector 218 includes only a diode for receiving the RF signal. Filter 220 may represent any type or number of low-pass filters and/or band pass filters to remove any high-frequency noise and/or any DC component from the signal. ADC 222 may be a threshold detector formed with one or more operational amplifiers or any other known conversion circuitry to digitize the analog signal.

According to some embodiments, second receiver path 206 includes a mixer 224 configured to receive the RF input signal and mix the signal with a local oscillator (LO) 226. In some examples, LO signal 226 is first buffered with a buffer 228 before being mixed with the RF input signal at mixer 224. The LO 226 may be provided by a PLL that is locked into a given frequency to down convert the received RF signal to a more manageable frequency band where the blocker can be more easily distinguished and filtered out. Second receiver path 206 also includes filter 230, which may represent any type or number of low-pass filters and/or band pass filters to remove any high-frequency noise and/or any DC component from the signal. Similar to first receiver path 204, second receiver path 206 can also include a diode detector 232 and an ADC 234 designed to work together to convert the analog signal to a digital signal. Diode detector 232 may include only a diode and ADC 234 may be a threshold detector formed with one or more operational amplifiers or any other known conversion circuitry to digitize the analog signal.

Figure 2B:
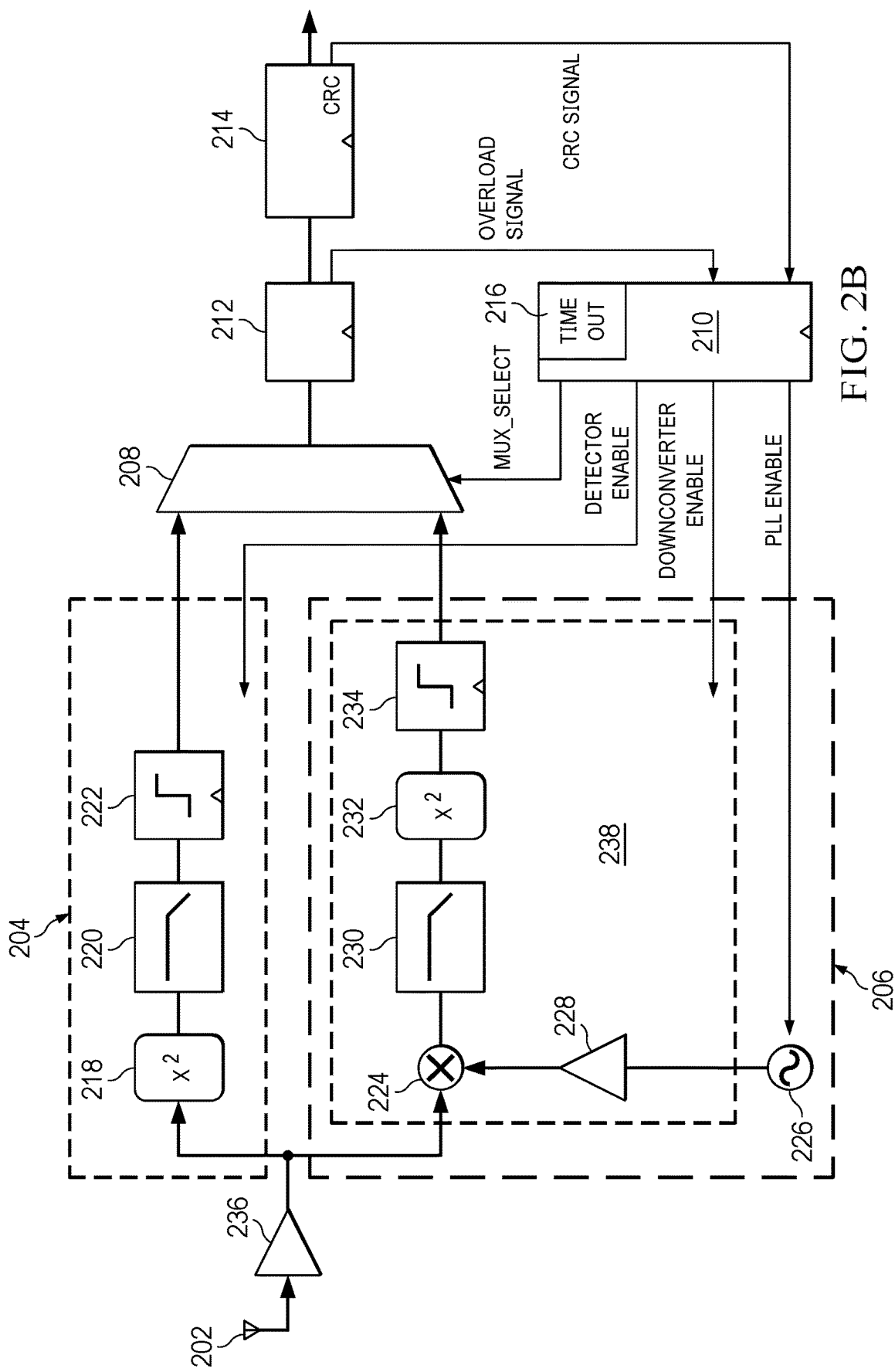
FIG. 2B is a block diagram of another example of an RF front end and digital logic of the receiver of FIG. 1.

FIG. 2B schematically illustrates details for another example topology of both RF front end 104 and blocker detection module 106. While many of the elements are the same as the topology illustrated in FIG. 2A (and the above relevant description is equally applicable here), second receiver path 206 receives two separate enable signals designed to control different portions of second receiver path 206. According to some embodiments, a PLL ENABLE signal is received from control logic module 210 and enables/disables the PLL that generates LO 226, while a DOWNCONVERTER ENABLE signal is received from control logic module 210 to enable/disable all other components 238 of second receiver path 206. In some examples, other components 238 includes the mixer, any filters, and ADC circuitry.

According to some embodiments, a separate enable signal is provided to the PLL to delay disabling the PLL while disabling other components 238 of second receiver path 206. This may be performed to avoid a situation where the PLL is constantly being turned off, then immediately turned on again after determining that a blocker signal is still present. The act of turning on the PLL consumes a great deal of power and time. By enabling the PLL separately, it can remain on while a signal is received via first receiver path 204, and then be turned off only after it is determined that the signal does not contain any blockers. If the signal does contain a blocker, then only other components 238 of second receiver path 206 need to be enabled as the PLL will already be in an enabled state.

Figure 3:
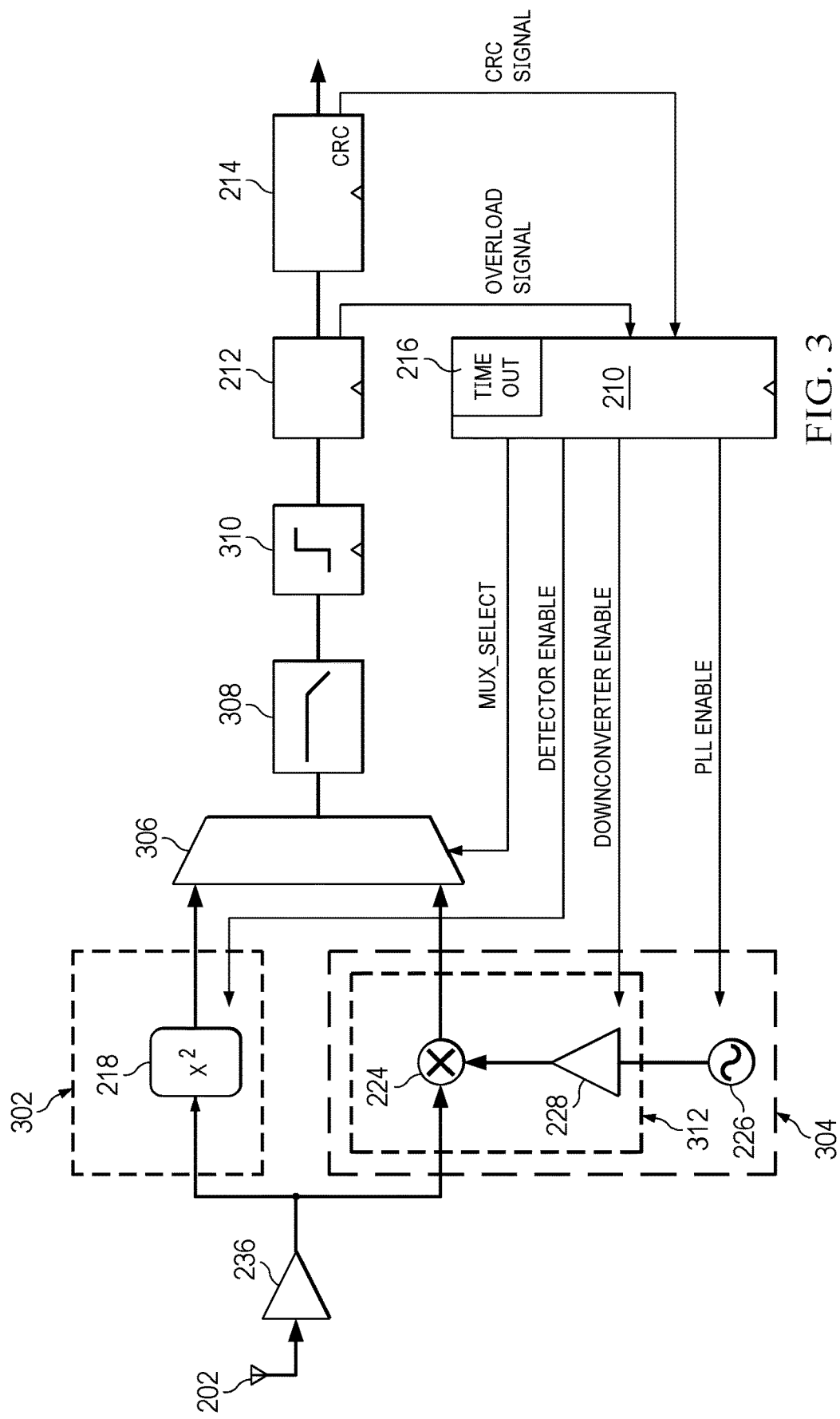
FIG. 3 is a block diagram of another example of an RF front end and digital logic of the receiver of FIG. 1.

FIG. 3 schematically illustrates details for another example topology of both RF front end 104 and blocker detection module 106. In this example, many of the shared components between first receiver path 204 and second receiver path 206 have been combined and are located after the selected RF path has been chosen to reduce the total number of circuit elements. According to an embodiment, the RF signal is received by antenna 202 and split between a first RF path 302 and a second RF path 304. In this example, first RF path includes only diode detector 218 and second RF path includes down conversion circuitry, such as mixer 224 and LO 226. The analog output of each RF path is fed to an analog switch 306 controlled via MUX_SELECT to select one of the analog inputs. Following switch 306 are one or more filters 308 designed to remove high-frequency noise and other sources of noise, and ADC 310 designed to convert the analog signal to a digital signal. Filters 308 and ADC 310 may be similar components to those described above with reference to FIG. 2A. Like the example described in FIG. 2B, separate enable signals may be provided to the PLL of second RF path 304 and to other components 312 of second RF path 304.

Example Timing Diagrams

Figure 4:
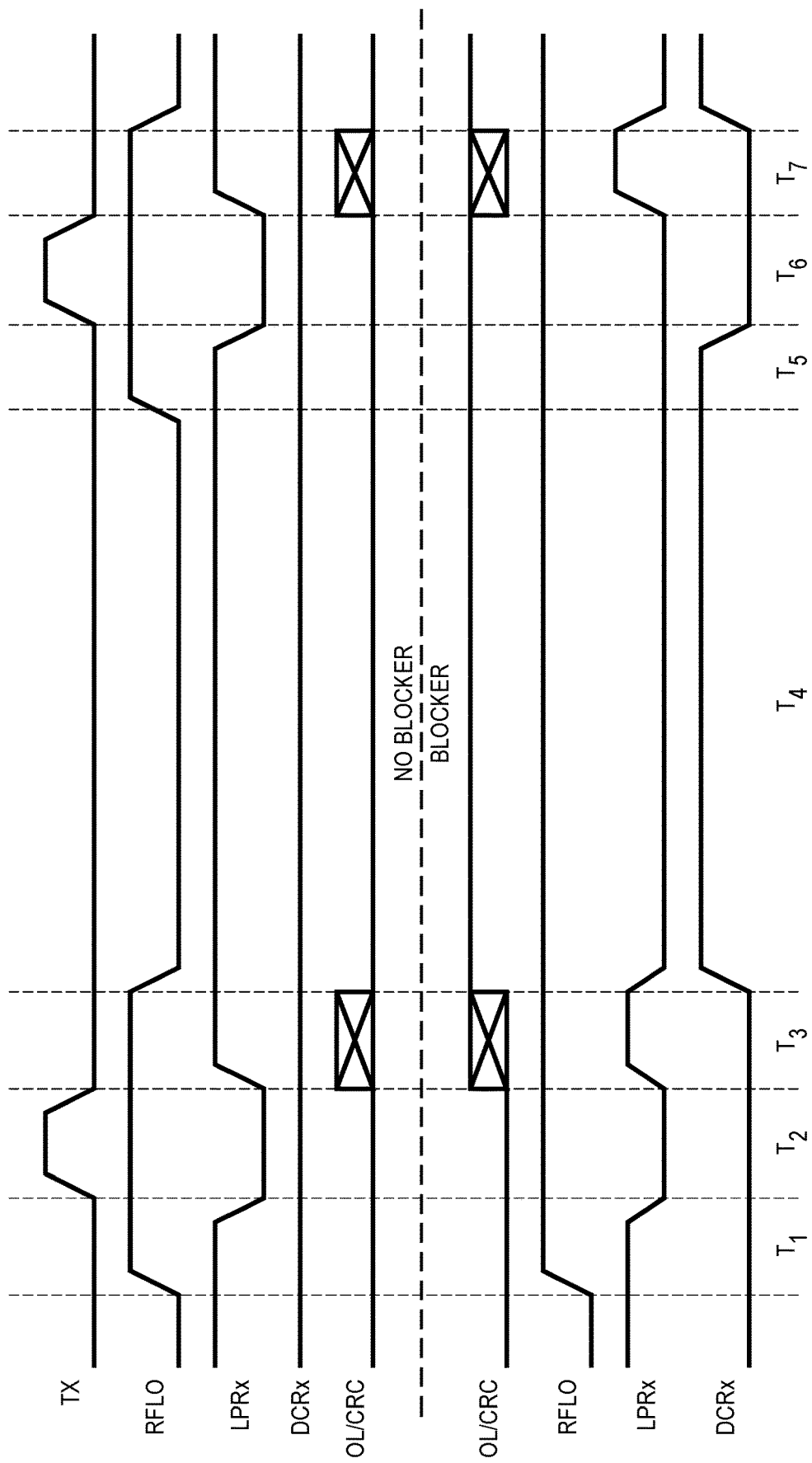
FIG. 4 illustrates an example timing diagram for various digital signals within the digital logic of the receiver of FIG. 1 during a transmission request for new data.

FIG. 4 illustrates a timing diagram that details the operation of receiver 100 during a transmission request for new data, according to some embodiments. The specific waveforms illustrated in the timing diagram of FIG. 4 provide just one example and waveforms having slightly different rise times, fall times, or amplitude levels can also be produced. With regards to the various labels used for the waveforms, TX represents a transmitted signal being sent from the device associated with receiver 100, RFLO represents an enable signal provided to the PLL of the second receiver path, LPRx represents an enable signal provided to the first receiver path, DCRx represents an enable signal provided to the other components of the second receiver path, and OL/CRC represents the output from either the overload detector or the CRC operation of the modem (e.g., an OR operation between the two) to indicate the presence of a blocker. All waveforms above the bolded black line represent a situation where no blocker is detected and all waveforms below the bolded black line represent a situation where a blocker is detected. As used herein, the term "high" is used to indicate a high logic level and the term "low" is used to indicate a low logic level.

During a first time period $T_1$, receiver 100 prepares itself for the transmission of data (e.g., to request for data to be sent from another device). In some embodiments, RFLO is high to activate the PLL in preparation for transmitting a signal (because the PLL is also used during signal transmission). The state of LPRx and DCRx may depend on which receiver path was previously being used—in this example, the first receiver path was previously being used and so LPRx is high while DCRx is low. In other examples, DCRx is high while LPRx is low.

During a second time period $T_2$, TX goes high to indicate signal transmission being performed (e.g., a transmitted request for data). During the signal transmission, both receiver paths are set to low to avoid any interference. According to some embodiments, the PLL remains on (e.g., RFLO is high) to be used during the data transmission process.

During a third time period $T_3$, the first receiver path is activated (LPRx goes high) to receive the incoming data signal. According to some embodiments, the PLL remains on (e.g., RFLO is high) so that it can be readily used if the received data signal includes a blocker. According to some embodiments, the overload detector and modem each perform their own detection routines on the digitized version of the received data signal to determine whether a blocker exists.

During a fourth time period $T_4$, the various waveforms will be different depending on whether a blocker was detected in the received signal. In the case of no blocker being detected (waveforms above the bolded line), the output of OL/CRC remains low and LPRx stays high to continue receiving the data across the first receiver path. Also, RFLO goes low to turn off the PLL as it is not being used when data is received across the first receiver path. Similarly, DCRx remains low as the second receiver path is not activated.

During time period $T_4$, in the case of a blocker being detected (waveforms below the bolded line), the output of OL/CRC goes high to indicate that a blocker was detected and LPRx goes low to deactivate the first receiver path. DCRx goes high to activate the second receiver path and receive the RF signal across the second receiver path where down conversion of the signal occurs and the blocker can be removed or attenuated. Accordingly, RFLO remains high as the PLL is used within the second receiver path to down convert the received signal.

During a fifth time period $T_5$, receiver 100 prepares itself for the transmission of data in a manner similar to that done during time period $T_1$. Depending on whether a blocker was previously detected or not, LPRx may be high (in the case where no blocker was detected) or DCRx may be high (in the case where a blocker was detected). In either case, RFLO either remains high or is asserted high to ensure the PLL is ready to use for transmission, according to some embodiments. Afterwards, time periods $T_6$ and $T_7$ act in the same way as time periods $T_2$ and $T_3$, respectively, as the process repeats itself.

Figure 5:
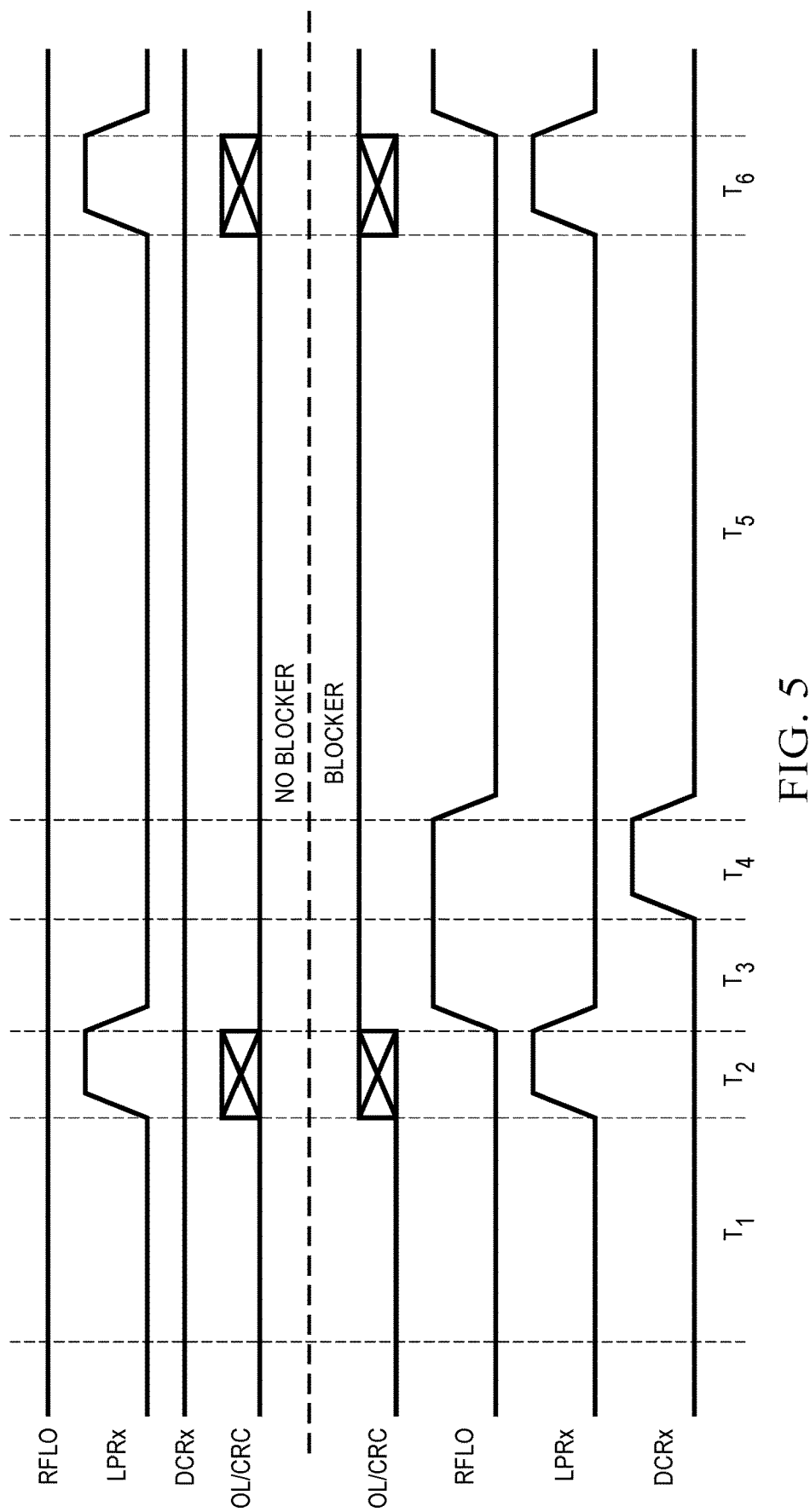
FIG. 5 illustrates another example timing diagram for various digital signals within the digital logic of the receiver of FIG. 1 during a ping operation (listening for data signals).

FIG. 5 illustrates a timing diagram that details the operation of receiver 100 during a ping operation where receiver 100 periodically wakes up to listen for RF signals, according to some embodiments. The specific waveforms illustrated in the timing diagram of FIG. 5 provide just one example and waveforms having slightly different rise times, fall times, or amplitude levels can also be produced. Similar labels are used for the waveforms as those described above with reference to FIG. 4.

During a first time period $T_1$, receiver 100 is deactivated (e.g., asleep) and as such all signals are low, according to some embodiments. Time period $T_1$ can last for any amount of time depending on how often receiver 100 is configured to wake up.

During a second time period $T_2$, receiver 100 awakes and listens for an RF signal via the first receiver path. Accordingly, LPRx goes high to enable the second receiver path while both DCRx and RFLO remain low. Also, during $T_2$, the overload detector and CRC operation of the Modem determine whether the received signal via the first receiver path has a blocker present, according to some embodiments.

During a third time period $T_3$ and fourth time period $T_4$, the various waveforms will be different depending on whether a blocker was detected in the received signal. In the situation where no blocker was detected, there is no need to perform any further operations after receiving the RF signal and receiver 100 returns to a sleep state where each of the signals goes low. This sleep state remains during time period $T_4$.

In a situation where a blocker was detected in the received RF signal, RFLO goes high during time period $T_3$ to prepare the PLL while a request is sent to retransmit the data. LPRx goes low as the first receiver path will not be used to receive the following RF signal (as it is known that a blocker exists). Then, at time period $T_4$, DCRx goes high to enable the second receiver path to receive the incoming RF signal. RFLO is also high to allow the PLL to operate and down-convert the received RF signal and remove or attenuate the blocker via the second receiver path.

In either case, after the RF signal has been received via the first receiver path or the second receiver path, receiver 100 goes back to sleep and all signals are made LOW as observed over the fifth time period $T_5$. According to some embodiments, receiver 100 remains in the sleep state until it is awakened to listen for the next RF signal at time period $T_6$, which mirrors the operation performed during time period $T_2$, as the process repeats itself.

Digital Logic Flowcharts

Figure 6:
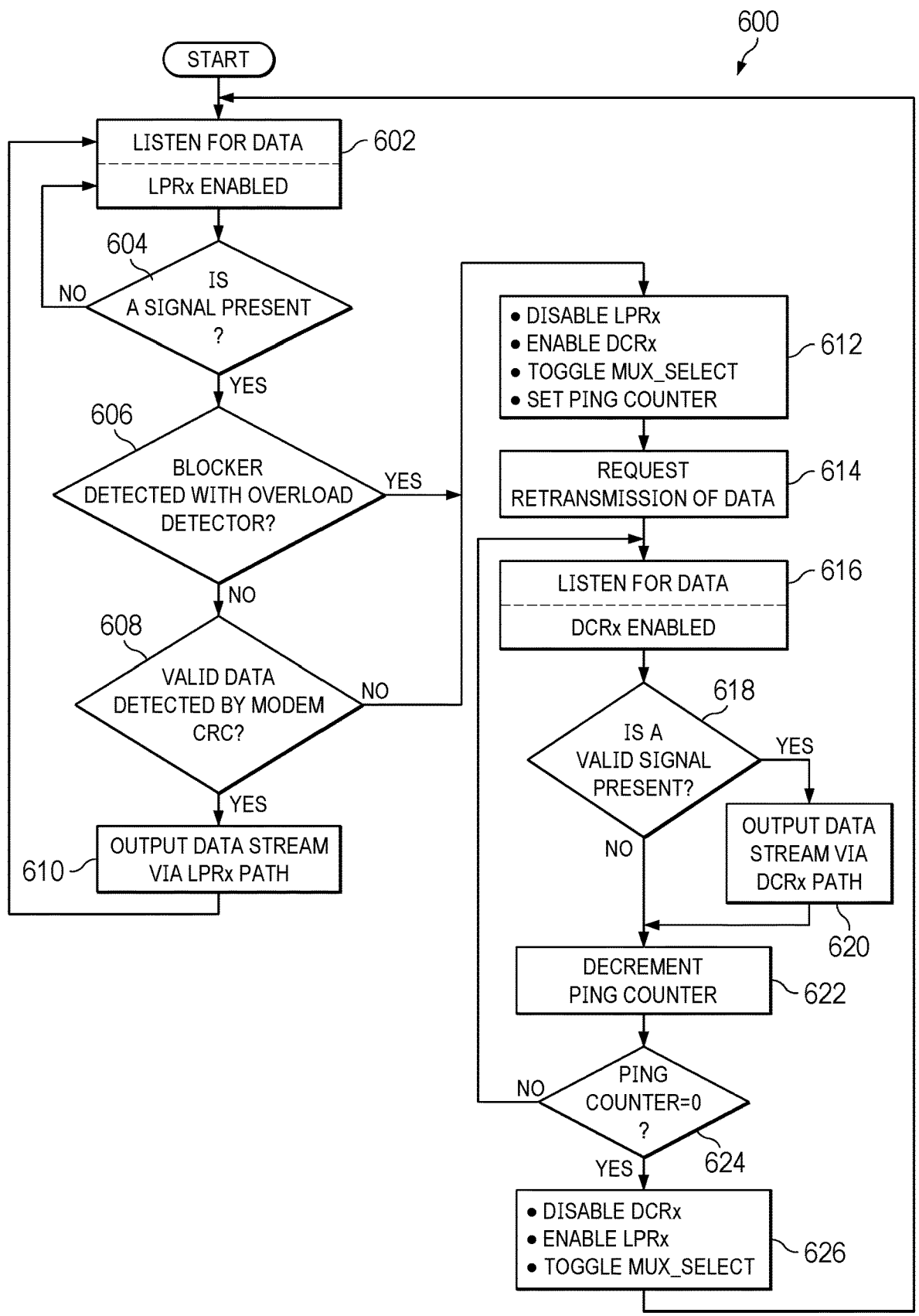
FIG. 6 illustrates a flow chart depicting the operation of the digital logic within the receiver of FIG. 1.

FIG. 6 illustrates an example flowchart 600 depicting the operation of the digital logic within digital logic module 210 along with operations performed by other components of receiver 100. Accordingly, the various operations shown in flowchart 600 may be performed by any of the components of receiver 100 illustrated in any of FIG. 2A, 2B, or 3. However, the correlation of the various operations of flowchart 600 to the specific components illustrated in the above-described drawings does not imply any structural and/or use limitations. Rather, the above-described drawings provide example embodiments of the operations of flowchart 600.

Flowchart 600 begins at block 602 where a receiver listens for new RF signals during a period of time that the receiver wakes up (e.g., a ping operation). During this ping operation, LPRx is enabled such that any received RF signals are received via the low-power first receiver path.

Operation continues to block 604 where a determination is made about whether a signal exists or not. If no signal exists, then the receiver returns back to block 602 and awaits the next ping operation to listen for more data. If an RF signal exists, then operation continues to block 606 where a determination is made about whether a blocker has been detected using an overload detector (e.g. a continuous wave blocker). Recall that the received signal at this point in the operation was received via the first receiver path, and thus has received no control signal to remove blockers. If the overload detector does not detect any blockers, then operation continues with block 608 where another determination is made about whether the received signal includes valid data. As described above, CRC may be used by a modem to determine validity of the received data, and invalid data may be indicative of a blocker present (e.g., a modulated blocker) or some other reason that is corrupting the data. If the data is determined to be valid via the CRC, then the digital data stream is output via the first receiver path (LPRx enabled path).

However, according to some embodiments, if either a blocker was detected with the overload detector or if invalid data was detected via CRC, then the operation proceeds to block 612. At block 612, various signals are asserted or deasserted to change the operating state of the receiver. For example, LPRx is deasserted to deactivate the first receiver path while DCRx is asserted to enable the second receiver path. Also, the MUX_SELECT signal is toggled to switch the multiplexer output to data received from the second receiver path. According to some embodiments, a ping counter is also set to an initial value to set a limit on how long the receiver will operate via the second receiver path until it switches back to the first receiver path. As described above, the value that ping counter is set to can be begin with an initial value (e.g., 10) and can be dynamically increased if it is discovered that the number of pings is not enough (e.g., a blocker is still detected immediately after returning to the first receiver path).

After setting various signal states in block 612, operation proceeds to block 614 where a request is sent to retransmit the data. This may be performed because the reception of the data was interrupted by changing over from the first receiver path to the second receiver path. Accordingly, after requesting retransmission of the data, operation proceeds to block 616 where the receiver listens for the new data to be received. Unlike block 602, the listening operation performed at block 616 has the second receiver path active (DCRx is enabled).

Operation continues to block 618 during each receiver ping to determine whether valid data exists, according to some embodiments. The received data may be validated via CRC as described above, and if the received data is found to be valid, then the operation continues to block 620 where the digital data stream is provided via the second receiver path. Afterwards, operation continues to block 622 where the ping counter is decremented by 1 to indicate that a single ping operation has occurred. If the received data is not valid for any reason (or if no signal exists at all) then operation proceeds directly to block 622 to decrement the ping counter.

According to some embodiments, after decrementing the ping counter, operation continues to block 624 where a determination is made about whether the ping counter has reached zero. If not, then the receiver will continue to receive data via the second receiver path and operation continues back to block 616. However, if the ping counter does equal zero, then operation continues to block 626 where various signals are asserted or deasserted to change the operating state of the receiver.

According to some embodiments, operation at block 626 includes deasserting DCRx to deactivate the second receiver path while asserting LPRx to enable the first receiver path. Also, the MUX_SELECT signal is toggled to switch the multiplexer output to data received from the first receiver path. Afterwards, operation proceeds back to block 602 to continue listening for new RF signals with the first receiver path enabled.

According to some embodiments, the receiver operates between blocks 602 and 610 for the vast majority of the time. Accordingly, the first receiver path is used for most signals as blockers may be highly infrequent in short distance communication applications. However, if a blocker is detected, the operating state of the receiver switches over to receive signals via the second receiver path and the receiver operates between blocks 616 and 624 for a given number of pings (e.g., as determined by the ping counter). The receiver then switches back to the first receiver path after the ping counter depletes to continue operating in a lower power state.

Figure 7:
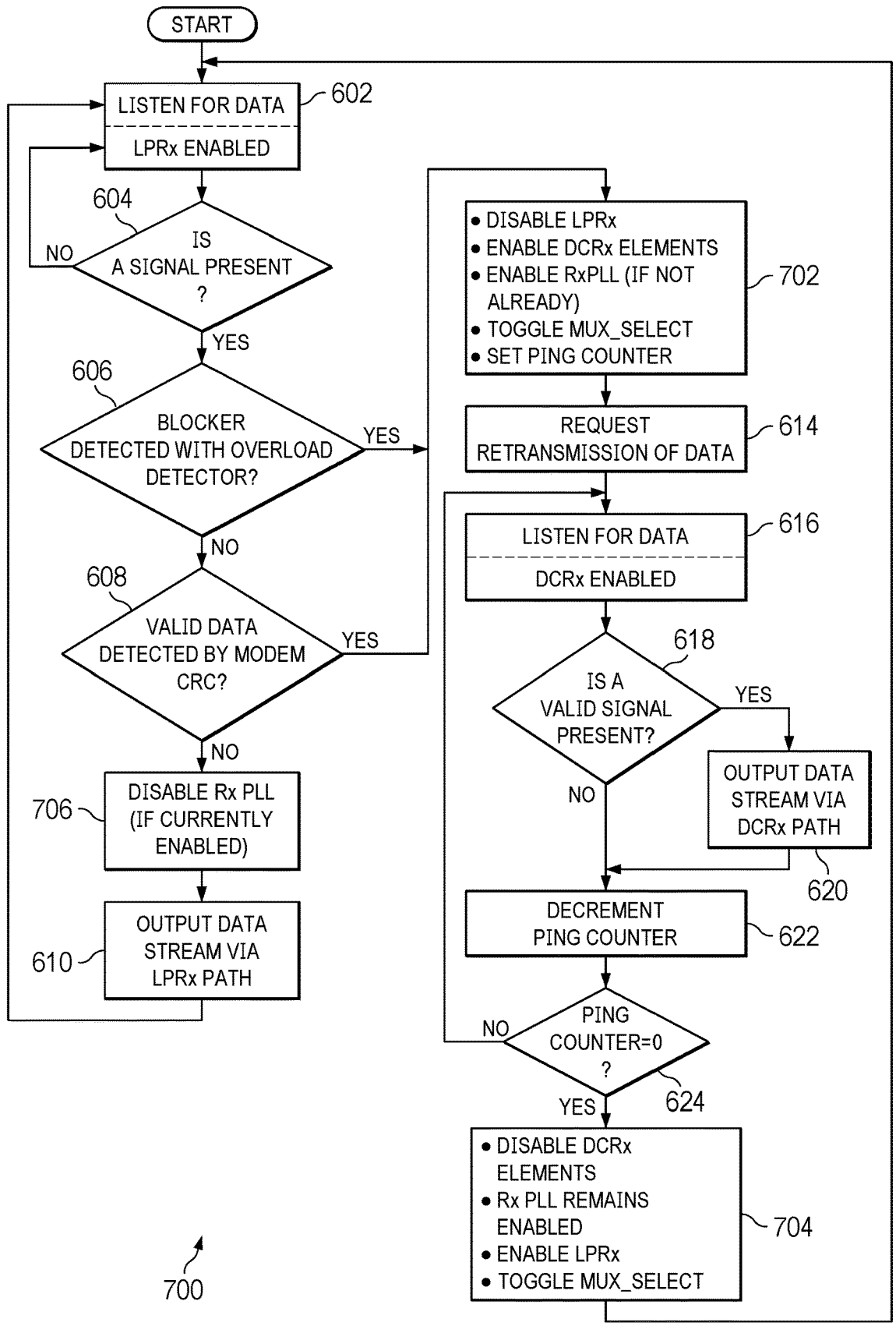
FIG. 7 illustrates another flow chart depicting the operation of the digital logic within the receiver of FIG. 1.

FIG. 7 illustrates another example flowchart 700 depicting the operation of the digital logic within digital logic module 210 along with operations performed by other components of receiver 100. Accordingly, the various operations shown in flowchart 700 may be performed by any of the components of receiver 100 illustrated in any of FIG. 2A, 2B, or 3. However, the correlation of the various operations of flowchart 700 to the specific components illustrated in the above-described drawings does not imply any structural and/or use limitations. Rather, the above-described drawings provide example embodiments of the operations of flowchart 700. Flowchart 700 contains many of the same operations as flowchart 600, but with using different enable signals to separately enable the PLL from the other components of the second receiver path. Accordingly, description of the shared elements between the two flowcharts is not repeated.

During the operation of the receiver via the first receiver path, if a blocker is detected at block 606, or if the data is determined to be invalid at block 608, the operation proceeds to block 702. At block 702, various signals are asserted or deasserted to change the operating state of the receiver. For example, LPRx is deasserted to deactivate the first receiver path while the receiver PLL is separately asserted from the other elements of the second receiver path (e.g., DCRx is enabled to activate the other elements of the second receiver path). Also, the MUX_SELECT signal is toggled to switch the multiplexer output to data received from the second receiver path. According to some embodiments, a ping counter is also set to an initial value, which can be dynamically increased, as described above.

Operation of the receiver using the second receiver path continues from blocks 614 through 624 in the same way as described above in flowchart 600. After the ping counter has been depleted, operation continues to block 704 where the other elements of the second receiver path are deactivated (DCRx is deasserted). However, according to some embodiments, the receiver PLL remains active even though the first receiver path is activated (LPRx is enabled) and MUX_SELECT is toggled to set the multiplexer to receive the output from the first receiver path. As described above, the receiver PLL may remain enabled to avoid situations where the PLL is switched off and then immediately switched back on if a blocker is still determined to be present (or the data is found to be invalid). Operation then continues back to block 602.

According to some embodiments, the receiver PLL is deactivated only after data has been cleanly received (e.g., no blockers and valid data) via the first receiver path. Accordingly, at block 706 the receiver PLL is disabled (if it is currently enabled) after determining that the received RF signal via the first receiver path has no blocker present and includes valid data. Otherwise, the PLL is already enabled when the operation proceeds to block 702 to switch the operating state of the receiver over to the second receiver path.

Some of the embodiments described herein may be implemented in hardware such as a field programmable gate array (FPGA) or application-specific integrated circuit (ASIC) or purpose-built semiconductor that have functionality defined by hardware description languages such as very high-speed integrated circuit (VHSIC) hardware description language (VHDL) or Verilog. The hardware description language that defines the structure and functions of the hardware may be stored on any machine-readable medium or article. The machine-readable medium or article includes, for example, any suitable non-transient type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like.

A device (e.g., a circuit, or component) that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more passive elements (such as passive filters), and/or one or more active elements (such as PLLs, operational amplifiers, rectifiers, etc.) may instead include only the active elements within a single physical device (e.g., a semiconductor die and/or integrated circuit (IC) package) and may be adapted to be coupled to at least some of the passive elements to form the described structure either at a time of manufacture or after a time of manufacture, for example, by an end-user and/or a third-party.

Circuits described herein may be reconfigurable to include replaced components to provide functionality at least partially similar to functionality available prior to the component replacement. Components shown, unless otherwise stated, may be generally representative of any one or more elements coupled in series and/or parallel to provide a desired feature or function. For example, a resistor or capacitor depicted as a single component may instead be multiple resistors or capacitors, respectively, coupled in series and/or parallel between the same two nodes as the single resistor or capacitor, to provide a desired impedance; likewise, a register may be a set of registers coupled together to provide register of a desired size.

In this description, unless otherwise stated, "about," "approximately," or "substantially" preceding a parameter means being within +/−10 percent of that parameter. Modifications are possible in the described examples, and other examples are possible within the scope of the claims.

FURTHER EXAMPLE EMBODIMENTS

Example 1 is a receiver that includes a first receiver path comprising a diode detector configured to receive an input analog signal, and a first analog-to-digital converter configured to produce a first digital signal, a second receiver path comprising a mixer configured to mix the input analog signal with a local oscillator signal, and a second analog-to-digital converter configured to produce a second digital signal, and a blocker detection module configured to switch an output of the receiver from the first digital signal to the second digital signal responsive to a determination that a blocking signal exists with the input analog signal or that the input analog signal contains invalid data.

Example 2 includes the receiver of Example 1, wherein the receiver further comprises an antenna configured to receive an input analog signal, and a low noise amplifier (LNA) configured to receive the input analog signal from the antenna, and to provide a first amplified analog signal to the first receiver path and a second amplified analog signal to the second receiver path.

Example 3 includes the receiver of Example 1 or 2, wherein the first receiver path comprises a first low-pass filter and the second receiver path comprises a second low-pass filter.

Example 4 includes the receiver of any one of Examples 1-3, wherein the blocker detection module comprises a multiplexer (MUX) configured to switch between the first digital signal and the second digital signal based on a MUX select signal and to provide a selected digital signal.

Example 5 includes the receiver of Example 4, wherein the blocker detection module comprises an overload detector configured to receive the selected digital signal and to determine whether a blocking signal exists within the selected digital signal.

Example 6 includes the receiver of Example 5, wherein the overload detector is configured to determine that a blocking signal exists within the selected digital signal if a particular number of sequential '1' bits are identified in the selected digital signal.

Example 7 includes the receiver of Example 5 or 6, wherein the blocker detection module comprises a modem configured to receive the selected digital signal and to determine whether the selected digital signal includes invalid data.

Example 8 includes the receiver of Example 7, wherein the modem is configured to determine whether the selected digital signal includes invalid data using cyclic redundancy checking.

Example 9 includes the receiver of Example 7 or 8, wherein the blocker detection module comprises a control logic module configured to receive a first control signal from the overload detector and a second control signal from the modem and to generate, based on the first and second control signals, the MUX select signal, a first enable signal configured to enable or disable the first receiver path, and a second enable signal configured to enable or disable the second receiver path.

Example 10 includes the receiver of Example 9, wherein the control logic module comprises a delay counter that is configured to delay asserting the first enable signal by a particular number of received data packets after asserting the second enable signal.

Example 11 includes the receiver of Example 9 or 10, wherein the second receiver path comprises a phase-locked loop (PLL), the second enable signal is configured to enable or disable the PLL, and the control logic module is further configured to generate a third enable signal configured to enable or disable one or more other elements of the second receiver path.

Example 12 includes the receiver of any one of Examples 9-11, wherein the overload detector is configured to assert the first control signal responsive to determining that a blocking signal exists within the selected digital signal.

Example 13 includes the receiver of any one of Examples 9-12, wherein the modem is configured to assert the second control signal responsive to determining that the selected digital signal includes invalid data.

Example 14 includes the receiver of any one of Examples 9-13, wherein the control logic module is configured to assert the MUX select signal responsive to either the first control signal or the second control signal being asserted.

Example 15 is an integrated circuit or chip set for use within an analog receiver. The integrated circuit or chip set includes a multiplexer, an overload detector, a modem, and a control logic module. The multiplexer is configured to switch between a first digital signal representing an input analog signal received via a first receiver path and a second digital signal associated with the input analog signal received via a second receiver path based on a MUX select signal, and provide a selected digital signal. The overload detector is configured to receive the selected digital signal, determine whether a blocking signal exists within the selected digital signal, and responsive to determining that a blocking signal exists within the selected digital signal, asserting a first output control signal. The modem is configured to receive the selected digital signal, determine whether the selected digital signal includes invalid data, and responsive to determining that the selected digital signal includes invalid data, assert a second output control signal. The control logic module is configured to receive the first output control signal and the second output control signal, and toggle a state of the MUX select signal based on the first output control signal or the second output control signal.

Example 16 includes the integrated circuit or chip set of Example 15, wherein the overload detector is configured to determine that a blocking signal exists within the selected digital signal if a particular number of sequential '1' bits are identified in the selected digital signal.

Example 17 includes the integrated circuit or chip set of Example 15 or 16, wherein the modem is configured to determine whether the selected digital signal includes invalid data using cyclic redundancy checking.

Example 18 includes the integrated circuit or chip set of any one of Examples 15-17, wherein the control logic module is further configured to toggle a first enable signal coupled to the first receiver path based on the first output control signal or the second output control signal, and to toggle a second enable signal coupled to the second receiver path based on the first output control signal or the second output control signal.

Example 19 includes the integrated circuit or chip set of Example 18, further comprising a delay counter that is configured to delay toggling the first enable signal by a particular number of received data packets after toggling the second enable signal.

Example 20 includes the integrated circuit or chip set of Example 18 or 19, wherein the control logic module is further configured to toggle a third enable signal coupled to the second receiver path based on the first output control signal or the second output control signal.

Example 21 includes the integrated circuit or chip set of Example 20, wherein the second enable signal is configured to enable or disable a PLL within the second receiver path and the third enable signal is configured to enable or disable one or more other elements within the second receiver path.

Example 22 is a receiver that includes an antenna configured to receive an input analog signal, a first receiver path comprising a diode detector configured to receive the input analog signal and to provide a first analog signal, and a second receiver path configured to receive the input analog signal and to provide a second analog signal. The second receiver path comprises a mixer configured to mix the input analog signal with a local oscillator signal. The receiver also includes a switch configured to select between the first analog signal and the second analog signal responsive to a received MUX select signal and configured to produce a selected analog signal, an analog-to-digital converter configured to receive the selected analog signal and configured to produce a selected digital signal, and a control logic module configured to toggle the MUX select signal responsive to a determination that a blocking signal exists within the selected digital signal or that the selected digital signal contains invalid data.

Example 23 includes the receiver of Example 22, further comprising a low noise amplifier (LNA) configured to receive the input analog signal from the antenna, and to provide a first amplified analog signal to the first receiver path and a second amplified analog signal to the second receiver path.

Example 24 includes the receiver of Example 22 or 23, further comprising a low-pass filter configured to receive the selected analog signal.

Example 25 includes the receiver of any one of Examples 22-24, wherein the control logic module comprises an overload detector configured to receive the selected digital signal and to determine whether a blocking signal exists within the selected digital signal.

Example 26 includes the receiver of Example 25, wherein the overload detector is configured to determine that a blocking signal exists within the selected digital signal if a particular number of sequential '1' bits are identified in the selected digital signal, and to assert a first control signal responsive to the blocking signal being present within the selected digital signal.

Example 27 includes the receiver of Example 26, wherein the control logic module is configured to toggle the MUX select signal responsive to the first control signal being asserted.

Example 28 includes the receiver of any one of Examples 22-27, wherein the control logic module comprises a modem configured to receive the selected digital signal, determine whether the selected digital signal includes invalid data, and to assert a second control signal responsive to the selected digital signal including invalid data.

Example 29 includes the receiver of Example 28, wherein the control logic module is configured to toggle the MUX select signal responsive to the second control signal being asserted.

Example 30 is an integrated circuit or chip set that includes the receiver of any one of Examples 1-14 or 22-29.

Example 31 is a set of one or more printed circuit boards that includes the receiver of any one of Examples 1-14 or 22-29, or the integrated circuit or chip set of any one of Examples 15-21 or 30.

Example 32 is system including a housing, a first printed circuit board, and a second printed circuit board, in which one of the first or second printed circuit boards includes the receiver of any one of Examples 1-14 or 22-29, or the integrated circuit or chip set of any one of Examples 15-21 or 30.

Example 33 is system including a housing, a printed circuit board, and an integrated circuit, in which one of the printed circuit board or the integrated circuit includes the receiver of any one of Examples 1-14 or 22-29.

Example 34 is a short distance communication system that includes the receiver of any one of Examples 1-14 or 22-29, or the integrated circuit or chip set of any one of Examples 15-21 or 30, or the set of one or more printed circuit boards of Example 31, or the system of Example 32.

Example 35 includes the system of Example 34, in which the communication distance is in the millimeter range, such as less than 50 millimeters (~2 inches), or less than 25 mm (~1 inch). In one such example, the distance is in the range of about 5 mm to 10 mm.

The invention claimed is:

1. An apparatus comprising:
a first receiver circuit having a first receiver input and a first receiver output;
a second receiver circuit having a second receiver input and a second receiver output, the second receiver input coupled to the first receiver input;
a multiplexer having multiplexer inputs, a selection input, and a multiplexer output, the multiplexer inputs coupled to the first and second receiver outputs; and
a blocker detection circuit having a detection input and a control output, the detection input coupled to the multiplexer output, and the control output coupled to the selection input.

2. The apparatus of claim 1, further comprising:
an antenna; and
a low noise amplifier (LNA) coupled between the antenna and the first and second receiver inputs.

3. The apparatus of claim 1, wherein the first receiver circuit includes a first peak detector and a first digitizer coupled between the first receiver input and the first receiver output, and the second receiver circuit includes a mixer, a second peak detector, and a second digitizer coupled between the second receiver input and the second receiver output.

4. The apparatus of claim 1, wherein the blocker detection circuit is configurable to set a state of the selection input responsive to determining whether a blocker signal is present at the first and second receiver inputs.

5. The apparatus of claim 4, wherein the blocker detection circuit is configurable to determine that the blocker signal is present responsive to detecting that the detection input remains at a particular state across a predetermined amount of time or spanning a predetermined number of bits.

6. The apparatus of claim 4, wherein the blocker detection circuit is configurable to determine that the block signal is present responsive to detecting invalid data or corrupt data at the detection input.

7. The apparatus of claim 4, wherein the control output is a first control output, the blocker detection circuit has a second control output and a third control output, the first receiver circuit has a first enable input coupled to the second control output, and the second receiver circuit has a second enable input coupled to the third control output.

8. The apparatus of claim 7, wherein the blocker detection circuit includes a delay circuit coupled between the third control output and the second control output.

9. The apparatus of claim 7, wherein the blocker detection circuit has a fourth control output, and the second receiver circuit includes a phase-locked loop (PLL) having a PLL enable input coupled to the fourth control output.

10. The apparatus of claim 1, wherein the first receiver circuit includes a peak detector coupled between the first receiver input and the first receiver output, the second receiver circuit includes a mixer coupled between the second receiver input and the second receiver output, and the apparatus further comprises a digitizer coupled between the multiplexer output and the detection input.

11. The apparatus of claim 1, wherein the blocker detection circuit includes at least one of an overload detector circuit or a cyclic redundancy checking (CRC) circuit.

12. The apparatus of claim 1, wherein the first receiver circuit consumes a lower amount of power than the second receiver circuit in operation.

13. An apparatus comprising:
- a multiplexer having a first multiplexer input, a second multiplexer input, a multiplexer output, and a selection input; and
- a blocker detection circuit having a detection input and a control output, the detection input coupled to the multiplexer output, the control output coupled to the selection input, the blocker detection circuit configurable to, responsive to detecting a blocker signal at the multiplexer output set a state of the selection input.

14. The apparatus of claim 13, wherein the blocker detection circuit is configurable to detect the blocking signal responsive to at least one of: detecting that the detection input remains at a particular state across a predetermined amount of time or spanning a predetermined number of bits, or detecting invalid or corrupt data at the detection input.

15. The apparatus of claim 13, wherein the control output is a first control output, and the blocker detection circuit has a second control output and a third control output; and
wherein the apparatus further comprises:
- a first receiver circuit coupled to the first multiplexer input, the first receiver circuit having a first enable input coupled to the second control output; and
- a second receiver circuit coupled to the second multiplexer input, the second receiver circuit having a second enable input coupled to the third control output.

16. The apparatus of claim 15, further comprising a delay circuit coupled between the third control output and the second control output.

17. The apparatus of claim 16, wherein the second receiver circuit includes a PLL having a PLL enable input, and the blocker detection circuit has a fourth control output coupled to the PLL enable input.

18. A method comprising:
- processing a first signal using a first receiver circuit to generate a second signal;
- determining, from the second signal, whether a blocker signal is present in the first signal;
- responsive to determining that the blocker signal is present, processing a third signal using a second receiver circuit to generate an output; and
- responsive to determining that the blocker signal is not present, processing the second signal using the first receiver circuit to generate the output.

19. The method of claim 18, wherein:
- processing a first signal using a first receiver circuit includes performing a first peak detection on the first signal to generate the second signal; and
- processing a third signal using a second receiver circuit includes mixing the third signal with a fourth signal to generate a fifth signal, and performing a second peak detection on the fifth signal to generate the output.

20. The method of claim 18, wherein determining, from the second signal, whether a blocker signal is present in the first signal includes at least one of: detecting that the second signal remains at a particular state across a predetermined amount of time or spanning a predetermined number of bits, or detecting invalid or corrupt data in the second signal.

21. The method of claim 18, further comprising:
responsive to determining that the blocker signal is present, disabling the first receiver circuit.

22. The method of claim 18, further comprising:
- disabling the second receiver circuit; and
- responsive to determining that the blocker signal is present, enabling the second receiver circuit.

* * * * *